(12) United States Patent
Sasikumar et al.

(10) Patent No.: US 8,407,322 B1
(45) Date of Patent: Mar. 26, 2013

(54) RUNTIME NEGOTIATION OF EXECUTION BLOCKS BETWEEN COMPUTERS

(75) Inventors: Anirudh Sasikumar, Bangalore (IN); Ramesh Srinivasaraghavan, Bangalore (IN); Arijit Chatterjee, Bangalore (IN)

(73) Assignee: Adobe Systems Incorporated, San Jose, CA (US)

( * ) Notice: Subject to any disclaimer, the term of this patent is extended or adjusted under 35 U.S.C. 154(b) by 115 days.

(21) Appl. No.: 12/861,934

(22) Filed: Aug. 24, 2010

(51) Int. Cl.
*G06F 15/177* (2006.01)
*G06F 9/45* (2006.01)

(52) U.S. Cl. ......... 709/220; 709/221; 709/222; 717/140

(58) Field of Classification Search .................. 709/203, 709/220, 221, 222; 717/140
See application file for complete search history.

(56) References Cited

U.S. PATENT DOCUMENTS

| | | | | |
|---|---|---|---|---|
| 5,459,854 A * | 10/1995 | Sherer et al. | ...................... | 713/1 |
| 6,535,869 B1 * | 3/2003 | Housel, III | .................... | 707/691 |
| 7,146,053 B1 * | 12/2006 | Rijavec et al. | ................ | 382/233 |
| 2007/0277162 A1 * | 11/2007 | Tanaka et al. | .................. | 717/140 |
| 2009/0178031 A1 * | 7/2009 | Zhao | ............................. | 717/143 |

* cited by examiner

*Primary Examiner* — Asghar Bilgrami
(74) *Attorney, Agent, or Firm* — Moser Taboada

(57) ABSTRACT

Methods, systems, and apparatus, including computer programs encoded on a computer storage medium, for providing software code capable of automated runtime negotiation of computation block execution between different computers. In one aspect, a method includes storing, on each of multiple devices, code blocks for a software application that performs a particular set of functions and assigning at runtime of the software application which of the devices is to execute each of the code blocks. Each of the code blocks is executed on the assigned devices and data is communicated between the assigned devices to facilitate executing different code blocks on different devices.

23 Claims, 5 Drawing Sheets

RUNTIME NEGOTIATION OF EXECUTION BLOCKS BETWEEN COMPUTERS

BACKGROUND

This specification relates to facilitating distribution of execution of blocks of software code between different computers at runtime.

Distributed systems enable multiple computers in communication over a network to work on a common problem, sharing the workload. Different computers within the network may have access to different resources and may also have different memory and storage capabilities. Applications can be written to take advantage of the capabilities of the different computers. For example, an application can be written such that some tasks are assigned to be performed by one computer and other tasks are assigned to be performed by another computer.

SUMMARY

This specification describes technologies relating to negotiating execution of computation blocks between a server and client or other computers at runtime. For software code included in an executable application, an index may be generated (e.g., by a compiler) identifying possible logical points in the code for switching between computers and identifying data to be passed at the switching points. The same software code can be stored on multiple computers, and the index can be used to dynamically coordinate switching of program execution between the computers during runtime. The various computers can negotiate with each other during execution or at runtime regarding which computers are to handle which parts of the program execution, based at least in part on the relative capabilities of the computers.

In general, one innovative aspect of the subject matter described in this specification can be embodied in methods that include the actions of storing a plurality of code blocks for a software application on each of a plurality of devices, where the software application is adapted to perform a particular set of functions, and assigning, by operation of a computer, at runtime of the software application which of the plurality of devices is to execute each of the plurality of code blocks. Each of the plurality of code blocks is executed on the assigned devices, and data is communicated between the assigned devices to facilitate executing different code blocks of the plurality of code blocks on different devices of the plurality of devices. Other embodiments of this aspect include corresponding systems, apparatus, and computer programs, configured to perform the actions of the methods, encoded on computer storage devices.

These and other embodiments can each optionally include one or more of the following features. Assigning which of the plurality of devices is to execute each code block is based on data defining at least one of execution constraints or characteristics of the code block. The data communicated between the assigned devices is identified based on an index defining boundaries between the code blocks and identifying variables operated on by each code block. A determination that a network connection is available for a device that initiates execution of the software application is made prior to determining which of the plurality of devices is assigned to execute each of the plurality of code blocks. Which device is assigned to execute each code block is dynamically determined based on at least one of available processing resources for one or more of the plurality of devices or a degree to which each code block uses processing resources of one or more of the plurality of devices. Code blocks are executed on at least two of the plurality of devices and variable values are shared between the at least two devices.

In general, another aspect of the subject matter described in this specification can be embodied in methods that include the actions of receiving software code including a plurality of code blocks, analyzing the software code to identify boundaries between the code blocks, generating an index of the boundaries between the code blocks, and storing the index for use in identifying portions of the software code to be executed on different computer devices during a subsequent execution of the software code. Other embodiments of this aspect include corresponding systems, apparatus, and computer programs, configured to perform the actions of the methods, encoded on computer storage devices.

These and other embodiments can each optionally include one or more of the following features. The methods can include the actions of identifying execution contexts for each code block and storing, in the index, data relating to the execution contexts for each code block. The execution contexts include at least one of input data, variables, or state data. The boundaries between the code blocks are defined by different logical operations performed by the code blocks on each side of each boundary. The boundaries between the code blocks are defined by operations on different input values on each side of each boundary. The boundaries between the code blocks are defined according to code blocks capable of execution on different computing devices. The analysis of the software code is performed by a compiler. The software code is adapted for execution in a client-server environment. The software code includes instructions to execute one or more specific code blocks on one of a particular device or particular type of device. At least one of the code blocks or the index includes metadata defining execution constraints.

In general, another aspect of the subject matter described in this specification can be embodied in systems that include a plurality of computers, a network adapted to facilitate communications between the plurality of computers, and a plurality of storage devices, with each storage device associated with a corresponding computer. Each storage device stores first instructions operable, when executed by the corresponding computer to perform a predefined set of operations. At least one of the storage devices stores an index defining boundaries between code blocks of the first instructions, and second instructions operable, when executed by the corresponding computer, to determine which of the plurality of computers should execute particular code blocks of the first instructions.

These and other embodiments can each optionally include one or more of the following features. At least one of the storage devices stores third instructions operable, when executed by the corresponding computer, to request directions from another of the computers regarding whether to transfer data to another of the plurality of computers for execution of one or more code blocks of the first instructions. The plurality of computers includes a client device and a server. The plurality of computers includes a plurality of peer computing devices. At least one of the storage devices includes data defining an execution context for one or more of the code blocks of the first instructions.

Particular embodiments of the subject matter described in this specification can be implemented so as to realize one or more of the following advantages. Developers may be able to build automatically scalable applications without creating extra client or server code. For example, application code written for a client may automatically run on a server. Servers may be enabled to balance loads by assessing load conditions and determining whether or not to handle computations. Users may experience improved application responsiveness and computation processing times. Execution of applications can be dynamically shifted between computers and/or servers based on conditions, available resources, or computer capabilities that are unpredictable when the application is written and compiled.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes systems and techniques for negotiating execution of computation blocks between multiple computers at runtime. In general, the computation blocks may include or may be based on executable code for running one or more software applications. A compiler can analyze the software code at build time to identify boundaries between code blocks and can store information associated with the boundaries in an index. Additionally, the compiler can identify data to be passed between the code blocks during execution and can store information associated with the identified data. At runtime (e.g., at the initiation of or during execution), multiple computers can execute the software code, using the index to dynamically coordinate switching of program execution. Based at least in part on the relative capabilities of the multiple computers, for example, the computers can negotiate with each other regarding which computers will handle which parts of the program execution.

Figure 1:
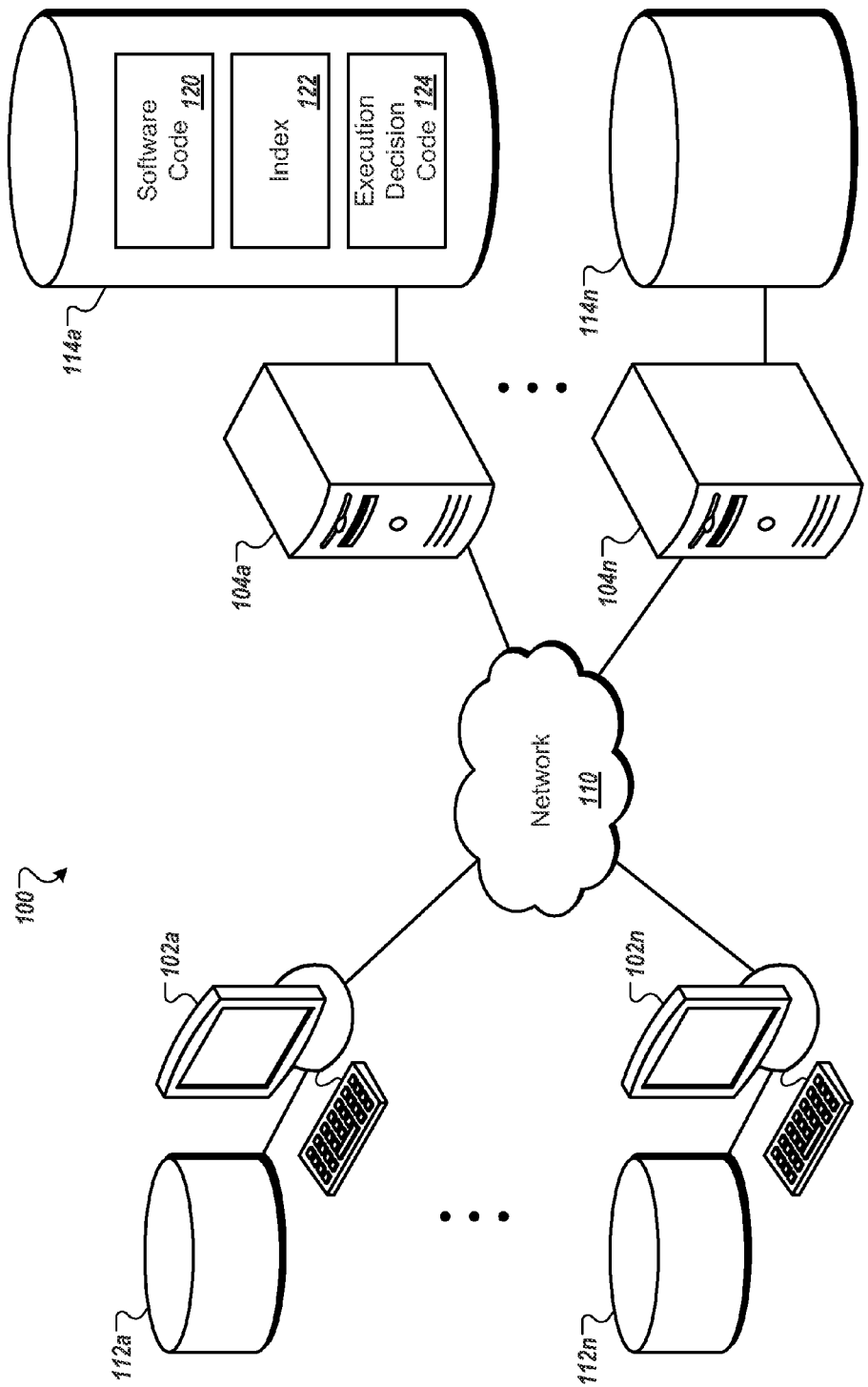
FIG. 1 is a diagram illustrating an example system for negotiating execution of code blocks among computers.

FIG. 1 is a diagram illustrating an example system 100 for negotiating execution of code blocks among multiple computers. The system 100 can include one or more client computers 102 (e.g., desktop computers, laptop computers, mobile computing devices, and the like), one or more server computers 104 (e.g., servers included in a data center or server farm), and a network 110 (e.g., the Internet) adapted to facilitate communication between the computers 102, 104. Each of the computers 102, 104 can include one or more processors configured to perform one or more operations of the system 100. Additionally, each of the computers 102, 104 can access one or more storage devices enabling the computers to store and retrieve instructions for performing a predefined set of operations. For example, each of the client computers 102 may be associated with a corresponding storage device 112, and each of the server computers 104 may be associated with a corresponding storage device 114.

In the present example, the storage device 114a can be used to store and provide software code 120. In some implementations, each of the storage devices 112, 114 may store complete or partial copies of the software code 120. For example, the software code 120 can be partitioned into multiple code blocks (i.e., computation blocks), and at least some of the same code blocks may be distributed to each of (or multiple ones of) the storage devices 112, 114 for execution by the corresponding computers 102, 104. In the present example, the storage device 114a can also be used to store an index 122 defining boundaries between code blocks of the software code 120, and to store execution decision code 124 for determining which of the computers 102, 104 should execute particular code blocks of the software code 120.

The software code 120 can be generated using one or more application programming languages, such as Java, C++, and the like, and can be used to execute one or more software applications. In some implementations, the software code 120 may be machine independent, and may include byte code. Code blocks of the software code 120 can be defined as a range of byte code using data included in the index, for example. Typically, one or more code blocks of the software code 120 are provided to one or more additional servers or one or more clients. For example, the client computer 102a can access a web page hosted by the server computer 104a which includes application code for executing a particular web application. Upon accessing the web page, for example, the client computer 102a can receive some or all of the code blocks of the software code 120 from the server computer 104a. As another example, code blocks of the software code 120 can be distributed as part of an application installation or setup process.

In some cases, the index 122 may be generated by the server computer 104a. For example, the server computer 104a can include a compiler (shown in FIG. 3) that analyzes the software code 120 to identify boundaries between the code blocks. Information related to the code block boundaries can be stored in the index 122, for example, in addition to information related to data used by or modified by the code blocks. For example, the code blocks may represent functions or partial functions of the software code 120. In some implementations, the index 122 may be maintained by a single computer in the system 100. For example, the computer server 104a can act as an index repository service, enabling various computers 102, 104 in the system 100 to refer to the index 122 when determining which code block to execute at runtime. In some implementations, multiple computers in the system 100 may store instances of the index 122. For example, each of the computers 102, 104 can refer to local instances of the index 122 (e.g., that are stored on the storage devices 112, 114 along with the installation of the software code 120).

In some cases, the execution decision code 124 is executed by the server computer 104a. For example, prior to or during execution of a particular code block of the software code 120, the execution decision code 124 can determine which of the computers 102, 104 is configured to effectively handle execution of the code block. In some implementations, the execution decision code 124 may be executed by a single computer in the system 100. For example, before executing a particular block of the software code 120, any of the computers 102, 104 may request that the server computer 104a execute the execution decision code 124 to determine which of the computers 102, 104 is to handle the code block. In some implementations, multiple computers in the system 100 can execute the execution decision code 124 or portions of the code 124. For example, prior to executing a particular code block of the software code 120, the client computer 102a can execute the execution decision code 124 to determine whether the computer 102a is suited for execution of the code 120, or to determine which of the computers 102, 104 may be optimally suited for execution of the code 120. In some implementations, the execution decision code 124 is built into the software code 120 or is otherwise stored in one or more of the storage devices 112, 114 along with the software code 120. For example, the software code 120 and the execution decision code 124 can be bundled together with or without the index 122 for distribution to one or more of the computers 102, 104 in the system 100.

In some cases, at least one of the storage devices 112, 114 stores data defining an execution context for one or more code blocks of the software code 120. For example, the execution context data includes data necessary for execution of the associated code block, including input data, state data, variables, and the like. Such data can be used by one or more computers 102, 104 in the system 100, for example, during execution of code blocks of the software code 120. In some implementations, execution context is passed between computers 102, 104. For example, upon the client computer 102a handing off program execution to the server computer 104a, the client computer 102a also passes execution context data associated with the particular code block of the software code 120 to be executed by the server computer 104a. In some implementations, execution context data is stored in a shared data area that is accessible by both the client computer 102a and, the server computer 104a. For example, the shared data area can be stored in memory maintained by the client computer 102a or the server computer 104a, and may be accessible by any of the computers 102, 104. In some implementations, instructions can be stored by one or more of the storage devices 112, 114 to enable corresponding computers 102, 104 to request directions from another of the computers 102, 104 regarding whether to transfer data for execution of one or more code blocks of the software code 120. For example, prior to requesting that the server computer 104a handle execution of a particular code block of the software code 120, the client computer 102a can retrieve such instructions from the storage device 112a, and based on a response to a request initiated based on such instructions, can either pass data (e.g., execution context data) to the server computer 104a, can pass no data to the computer 104a, or can direct the computer 104a to the shared data area.

The system 100 may be used in various configurations, including client-server configurations and peer-to-peer configurations. For example, in a client-server configuration, the client computer 102a with a connection to the server computer 104a can run the execution decision code 124 to determine at runtime whether a particular code block of the software code 120 may be more efficiently executed by the server computer 104a. If so, for example, the client computer 102a can pass program execution and can pass data related to the code block to the server computer 104a. In the present example, using the index 122 and related data, the server computer 104a can identify an entry point into the code block, can execute the code block, and can return results data associated with the computation to the client computer 102a. Upon receiving results data, for example, the client computer 102a can use the data and the index 122 to resume program execution. In some implementations, however, the server computer 104a can run execution decision code 124 to determine that a subsequent code block should also be executed by the server computer 104a Peer-to-peer configurations may include multiple client peers and/or multiple server peers. For example, in a peer-to-peer configuration, the server computer 104a may receive a request from one of the client computers 102 to handle execution of a particular code block of the software code 120. The server computer 104a may determine, for example, that based on current load conditions of the servers 104, a server computer 104n is relatively available to execute the particular code block of the software code 120. In some implementations, multiple client computers 102 may distribute computations. For example, the client computers 102 may use a protocol such as RTMFP (Real Time Media Flow Protocol) or the like to communicate with each other and to coordinate program execution. In some implementations, various capabilities of the computers 102, 104 in the system 100 may be considered when determining which computer is to execute a particular code block of the software code 120. For example, current or permanent available processing resources, memory, storage, and security requirements of the code block may be considered.

Figure 2:
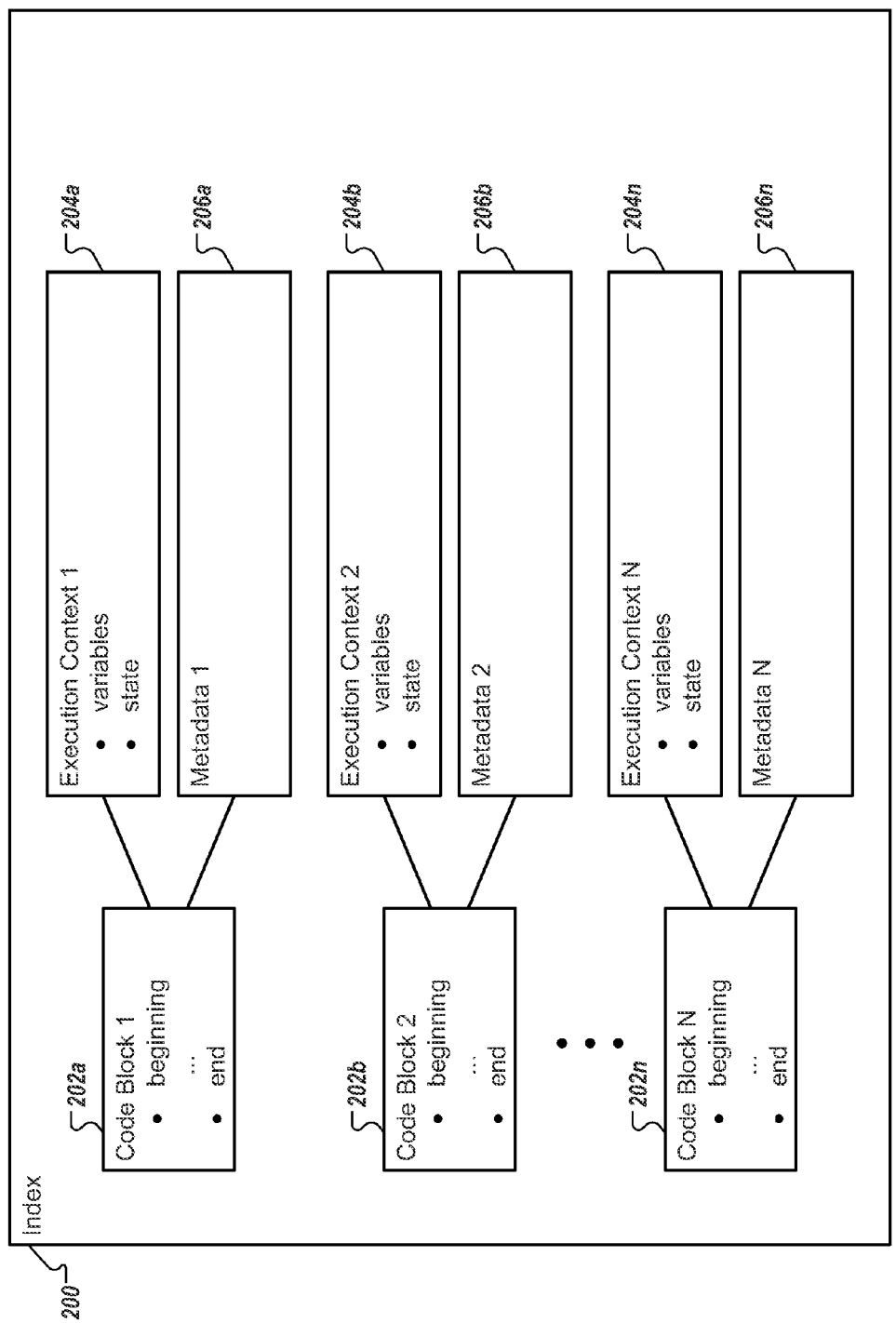
FIG. 2 is a block diagram illustrating the functional components of a software code block index.

FIG. 2 is a block diagram illustrating the functional components of a software code block index 200. In general, the index 200 may include information associated with one or more software code blocks, such as boundary information 202, execution context information 204, and metadata 206. In some implementations, the software code block index 200 may be used by multiple computers (e.g., the computers 102, 104 shown in FIG. 1) to coordinate runtime execution of common software code (e.g., the software code 120, also shown in FIG. 1) stored on each of the computers.

The boundary information 202 for each software code block can define beginning and end locations of the code block in the software code. In some implementations, the boundary information 202 can be used by a computer to identify locations in the software code corresponding to logical switch points between computers. For example, a particular computer may request that another computer handle execution of a particular code block. When handling execution of the code block, for example, the handling computer can access the index 200 and can retrieve boundary information 202a associated with the code block. Based on the boundary information 202a, for example, the handling computer can begin execution at the beginning location of the code block, and can proceed until reaching the ending location. Before or upon reaching the ending location, for example, the handling computer can notify the requesting computer that execution of the code block is complete. Upon receiving notification, for example, the requesting computer can use the index 200 to resume execution at a subsequent code block included in the software code, or can pass execution to another handling computer. Alternatively, the handling computer can make a decision whether to continue executing another code block of the software code.

The execution context information 204 for each software code block can describe variables and state data associated with the code block. For example, the execution context information 204 may include local and global variables associated with a particular code block. In some implementations, the execution context information 204 may be used by a handling computer to execute a particular code block, and to pass computation results to a requesting computer. For example, upon beginning computation of a particular code block, the handling computer can access the index 200 to identify necessary execution context information 204a and can retrieve the identified execution context information, including variables needed to execute the code block, from a computer that executes a preceding software block. In some implementations, the handling computer can receive variable values from the requesting computer along with a request to execute the software block. In other implementations, the handling computer can retrieve variable values from a shared data area.

Upon executing the code block, one or more of the variable values can be updated by the handling computer, for example. In some implementations, upon executing the code block, the handling computer returns updated or output variable values (e.g., as identified in the execution context information 204a) to the requesting computer. In some implementations, the handling computer may update the variable values in the shared data area.

The metadata 206 for each software code block can include information identifying requirements and constraints for a computer executing the code block. For example, such requirements and constraints may include where the code block is to be executed (e.g., in the cloud, on a client, etc.), when the code block is to be executed (e.g., synchronous, asynchronous—as quickly as possible, asynchronous—anytime, scheduled, etc.), which device or type of device is preferred or required for execution of the code block, and the type of runtime which is to be used (e.g., AVM, JVM, and the like). Additionally, such requirements and constraints may describe preferred characteristics for a computer executing the code block, such as preferred memory, storage, and security specifications. Thus, in some implementations, when multiple different handling computers in a peer-to-peer environment may potentially execute a particular code block, characteristics of the multiple computers can be compared with the metadata 206 by a requesting computer to identify a suitable computer for processing the code block.

Figure 3:
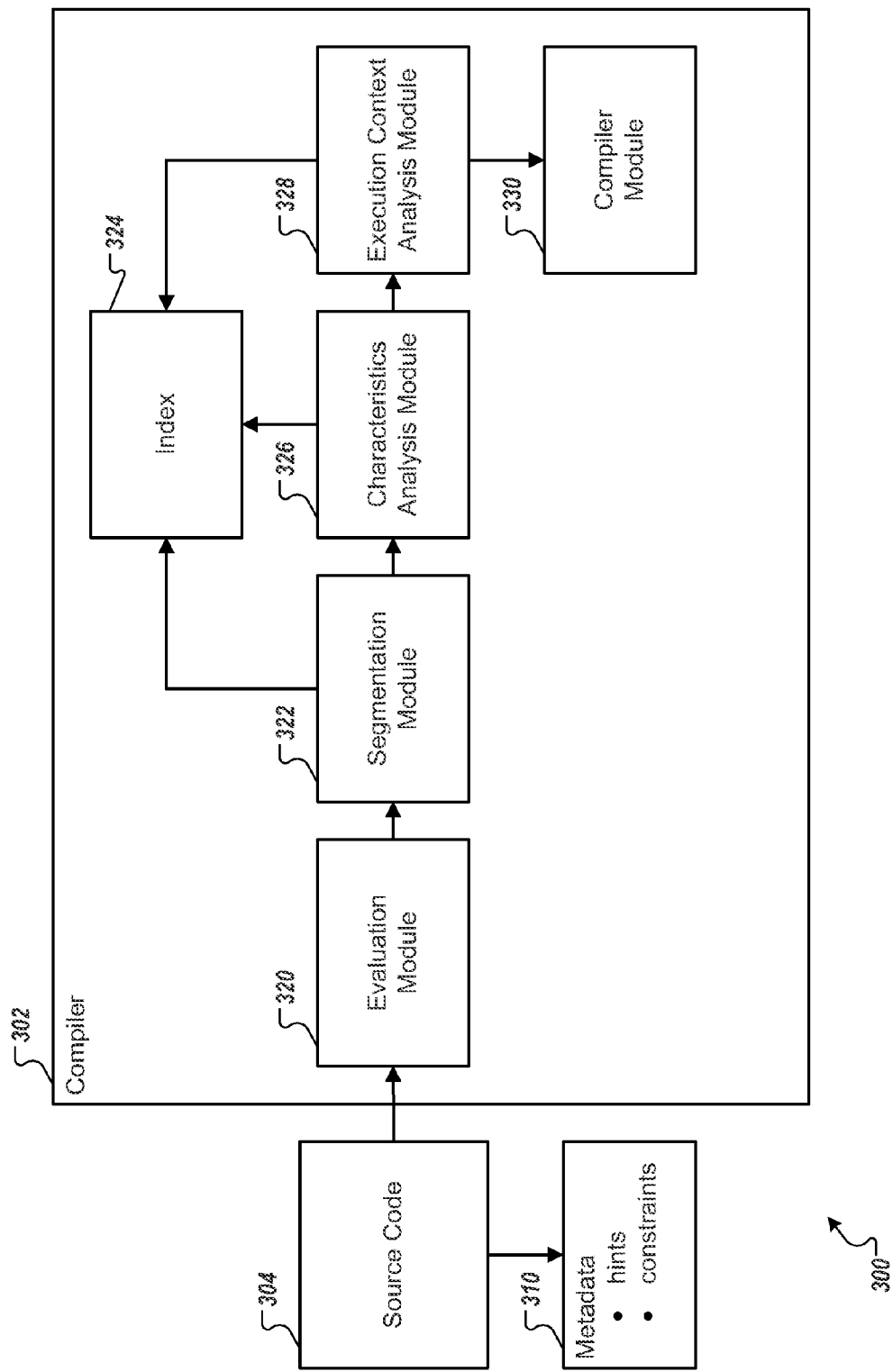
FIG. 3 is a process flow diagram illustrating an example process for compiling source code and building an index.

FIG. 3 is a process flow diagram illustrating an example process 300 for compiling source code and building an index. In general, the process 300 can be performed by a compiler 302 to transform source code 304 to prepare the code 304 for execution by multiple different computers. In some implementations, the compiler 302 can run on one or more of the computers 102, 104 (shown in FIG. 1), and the source code 304 may be stored by one or more of the storage devices 112, 114 (also shown in FIG. 1).

The source code 304 can be generated using one or more programming or scripting languages, for example. For example, the source code 304 can define the operations of a particular software application. In some cases, a developer of the source code 304 may define metadata 310 associated with the source code 304. The metadata 310 can include various hints and constraints identified by the developer, for example, to facilitate handoffs between different computers when executing code blocks based on the source code 310.

In some implementations, the developer may specify a hint for a particular part (e.g., a function or a part of a function) of the source code 304 indicating that the part should be executed by a particular computer at runtime. For example, for a client-server computing environment, the developer may indicate that a particular data processing function of an application should run on a server including a particular runtime environment. Upon running the application, the client can reference the hint and may request that the server run the processing function based on the hint. In some cases, the hint may be ignored. For example, the client may run the processing function instead of the server upon detecting a faulty or nonexistent connection to the server, or under other such circumstances.

In some implementations, the developer may specify one or more constraints for a computer executing a particular part of the source code 304. For example, a looping structure may require a certain amount of RAM. Thus, the developer may indicate in the metadata 310 that a computer executing the looping structure should have access to the specified amount of RAM. Upon running the looping structure, for example, a client computer may determine that it has access to insufficient RAM for executing the looping structure. In the present example, the client computer may request that a server computer or another client computer execute the looping structure. Other possible constraints indicated by the developer may include where the code block is to be executed, when the code block is to be executed, and the type of runtime which is to be used, as well as preferred memory, storage, and security specifications of an executing computer.

The compiler 302 includes an evaluation module 320 for evaluating the source code 304. For example, the evaluation module 320 can analyze the source code 304 and can identify boundaries between blocks of code. In some implementations, the boundaries can be identified based in part on potential data transfer between code blocks. For example, a particular part of the source code 304 identified as being relatively self-contained and requiring a relatively small amount of data to be transferred can be defined as a code block. In some implementations, the boundaries can be identified based in part on potential block size. For example, a code block can be determined to optimally be of a certain size, in order to balance the potential benefits of dynamic code switching with the potential overhead of communication between computers executing the code block. In some implementations, the boundaries can be identified based in part on the metadata 310. For example, the developer may explicitly define certain boundaries by introducing pragmas, compiler directives, or the like.

The compiler 302 also includes a segmentation module 322 for partitioning the source code 304 into code blocks. For example, the segmentation module 322 can use the boundaries identified by the evaluation module 320 for partitioning the source code 304. While partitioning the source code 304, for example, the segmentation module 322 may generate and update an index 324. The index 324 can be the same as or similar to the index 200 (as shown in FIG. 2), and the index 324 can include boundary information for each of the code blocks partitioned from the source code 304.

The compiler 302 also includes a characteristics analysis module 326 for identifying and defining execution constraints of the code blocks. For example, the characteristics analysis module 326 can use metadata 310 indicated by a developer of the source code 304 for identifying and defining the constraints. While analyzing characteristics of code blocks partitioned from the source code 304, for example, the characteristics analysis module 326 can update the index 324 with information related to the metadata 310.

The compiler 302 also includes an execution context analysis module 328 for identifying execution contexts for use in handoffs. For example, the execution context analysis module 328 can identify input data, state data, or variables used by code blocks partitioned from the source code 304. While analyzing execution context for code blocks, for example, the execution context analysis module 328 may update the index 324.

In some cases, static and dynamic variables may be handled differently by the execution context module 328. For example, the execution context analysis module 328 may identify static variables included in the code blocks and may include information associated with such variables in the index 324. Using certain programming languages (e.g., Java-Script), dynamic variables may be created during program execution. In some implementations, dynamic variables associated with a particular code block are passed in a separate dynamic data section during an execution handoff between multiple computers.

The compiler 302 includes a compiler module 330 for compiling code blocks partitioned from the source code 304.

In some implementations, the compiler module 330 generates byte code for each of the code blocks. For example, the byte code may be executed on various types of platforms configured to run the byte code using a runtime environment or virtual machine such as JVM (Java Virtual Machine). In some implementations, the compiler module 330 may generate object code or other compiled code.

Figure 4:
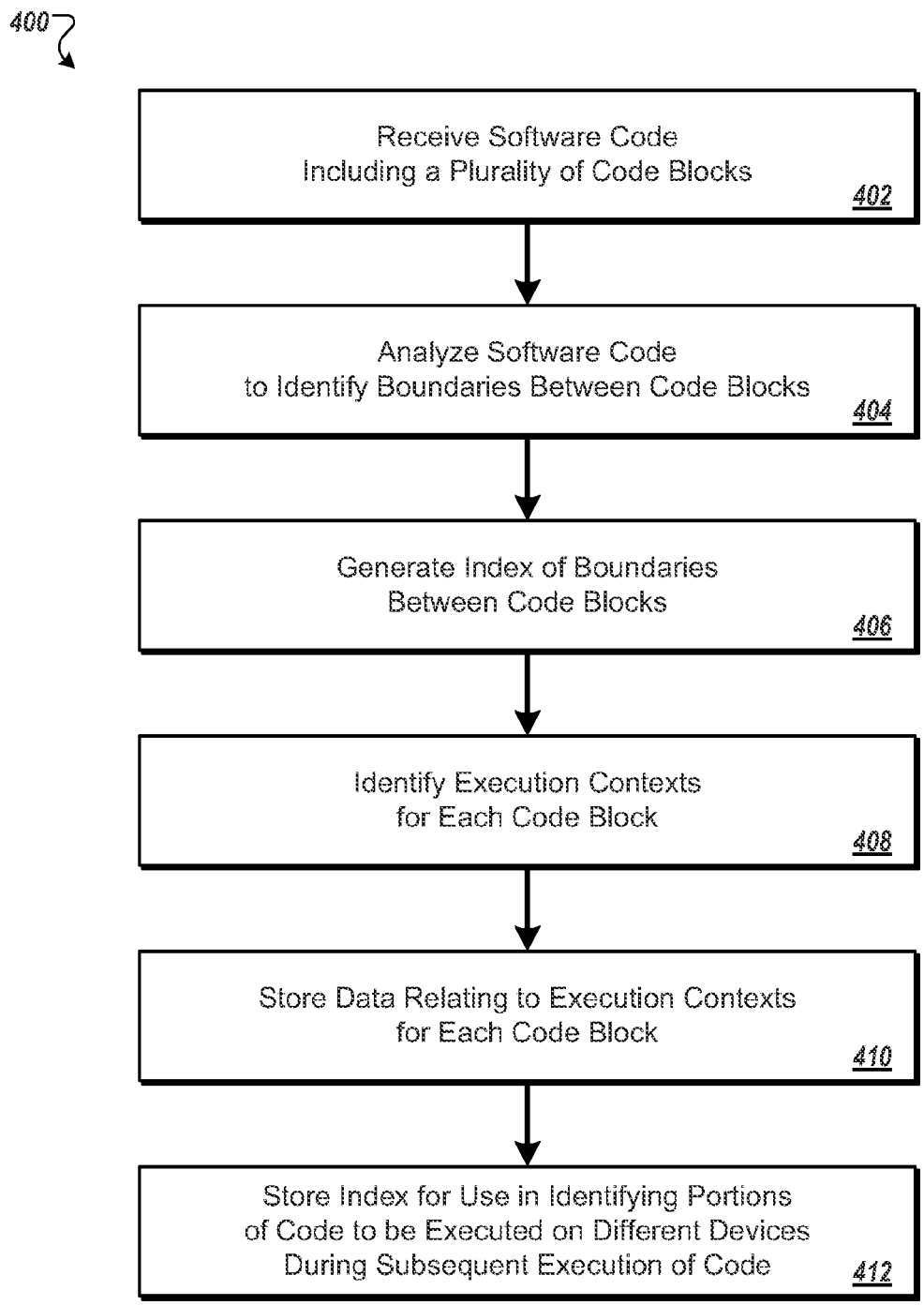
FIG. 4 is a flowchart illustrating an example process for building an index.

FIG. 4 is a flowchart illustrating an example process 400 for building an index. For example, the index may be used to identify portions of code to be executed on different computer devices during code execution. In general, the process 400 can be performed using a computer program encoded in a computer storage medium, the computer program including instructions that when executed by a data processing apparatus cause the apparatus to perform various operations. In some implementations, actions represented in the flowchart are performed by the compiler 302 (shown in FIG. 3), and will be described as such for clarity.

At 402, software code including a plurality of code blocks is received. For example, the compiler 302 can receive the software code (e.g., the source code 304) from a data storage device. The software code may be generated by a developer using one or more application programming languages, for example. In some implementations, the software code can be adapted for execution in a client-server environment. For example, the software code can include portions of code generally suitable for execution on a client computer, device and portions generally suitable for execution on one or more server computers. In some implementations, the software code can include instructions to execute one or more specific code blocks on a particular device or a particular type of device. For example, a developer of the software code can indicate that a particular code block should be executed by a client computer device, by multiple client devices (e.g., in peer-to-peer environment), by a particular server (e.g., a server hosted by a particular entity or including a particular configuration), or by multiple servers (e.g., in the cloud). The indication, for example, can be made using a directive, pragma, or the like.

At 404, software code is analyzed to identify boundaries between code blocks. For example, the evaluation module 320 can identify the code block boundaries. In some implementations, the boundaries between code blocks may be defined by different logical operations performed by the code blocks on each side of each boundary. For example, a particular looping structure may be identified as a code block, and operations preceding and following the looping structure may be identified as being part of different code blocks. As another example, one or more iterations of a code loop may be identified as a code block. In some implementations, the boundaries between the code blocks may be defined by operations on different input values on each side of each boundary or by a number of operations performed by a particular set of instructions. For example, a particular code function, procedure, or method accepting one or more parameters may be identified as a code block, and operations preceding and following the function, procedure, or method may be identified as being part of different code blocks. As another example, operations on a particular data structure (e.g., a text block, a media file, an array, or the like) may be identified as a code block. As another example, a subset of iterations of a set of instructions can be identified as a code block.

An index of boundaries between the code blocks is generated at 406. For example, the segmentation module 322 can update the index 324 with information associated with the code block boundaries. In some implementations, the boundaries may include beginning and ending locations of the code blocks. For example, a particular code block can be defined by a beginning location (i.e., an entry point) and an ending location (i.e., an exit point) for the code block.

At 408, execution contexts are identified for each code block. Execution context information, for example, can be used when handing off execution of the software code from one computer to another. In some implementations, the execution contexts can include input data, variables, or state data (e.g., virtual machine or hardware states). For example, a particular code block may use or modify a particular data object. When handing off execution of the code block, for example, a requesting computer may refer a handling computer to the execution context information by passing one or more values associated with the data object, or by directing the handling computer to a shared memory location storing the data object. In some implementations, a runtime or virtual machine (e.g., a JVM) may be configured to recognize dynamic variables. For example, along with execution context information provided to the runtime or virtual machine by the index, the runtime or virtual machine can supply dynamic variables and values. In some implementations, at least one of the code blocks or the index may include metadata including execution constraints. For example, the index 324 can be implemented in multiple parts, e.g., a base index for identifying block boundaries, another file for defining execution context information, and another file for defining metadata. Metadata, for example, can define one or more execution constraints for a particular block of code, e.g., where and when the code block is to be executed, the type of runtime which is to be used, and the preferred memory, storage, and security characteristics of an executing computer At 410, data is stored relating to execution contexts for each code block. For example, the execution context analysis module 328 can update the index 324 with information associated with the identified execution contexts. At 412, the index 324 is stored for use in identifying portions of code to be executed on different devices during subsequent execution of code. For example, the index 324 can be stored by one or more storage devices 112, 114 (shown in FIG. 1), and can be accessed by one or more computers 102, 104 (also shown in FIG. 1) when executing code blocks of the software code.

Figure 5:
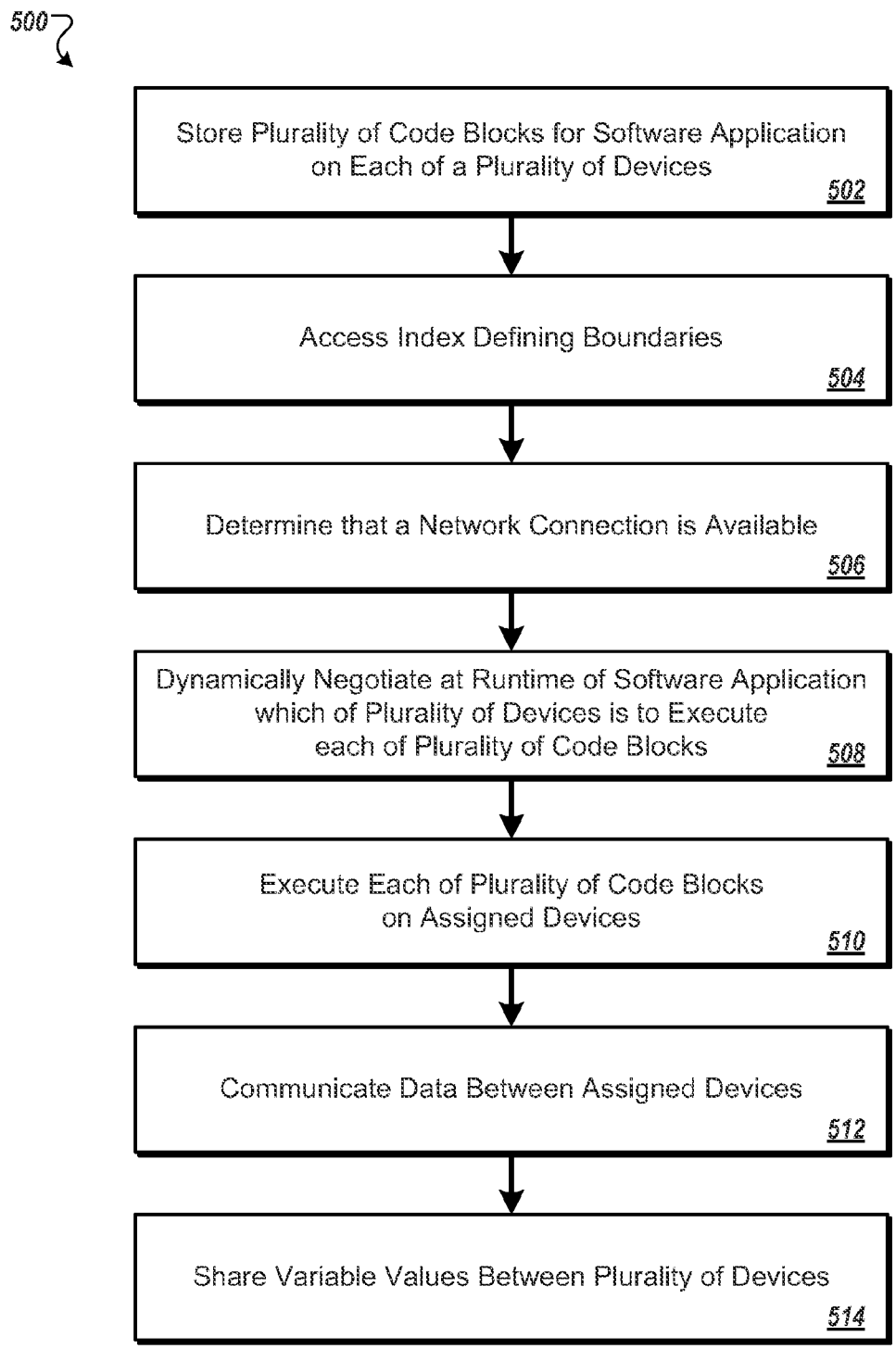
FIG. 5 is a flowchart illustrating an example process for executing software code blocks on different devices.

FIG. 5 is a flowchart illustrating an example process 500 for executing software code blocks on different devices. In general, the process 500 can be performed by multiple computers in communication over a network in a client-server or peer-to-peer environment. In some implementations, actions represented in the flowchart are performed by the computers 102, 104 in the system 100 (shown in FIG. 1) and will be described as such for clarity.

At 502, a plurality of code blocks for a software application is stored on each of a plurality of devices. For example, the code blocks can be stored on each of the storage devices 112 associated with the client computers 102, and can be stored on each of the storage devices 114 associated with the server computers 104. In general, the software application can be adapted to perform a particular set of functions. For example, the software application can be configured to collect and process data, and to present data to users.

At 504, an index defining boundaries is accessed. For example, the client computer 102a can access the index 122 (or a local version of the index 122) defining code block boundaries of the software application. At 506, a determination can be made that a network connection is available (or not available). In some implementations, the determination of network connection availability may be made by a device that initiates execution of the software application. For example, the client computer 102a can analyze its connection to the server computer 104a. In some implementations, the client computer 102a can determine aspects of the network connection such as quality and speed. Such connection aspects can be used as factors in determining which computer device in the system 100 should be assigned each of the code blocks, for example.

At 508, during runtime of the software application, one or more devices dynamically determine (i.e., negotiate) which of the plurality of devices is to execute each of the plurality of code blocks. For example, the client computer 102a and the server computer 104a can negotiate with each other regarding which code blocks should run on the client and which blocks should run on the server. In some implementations, the negotiation may be based at least in part on available processing resources (e.g., relative processor speed, number of processors, amount of available memory, and the like) of one or more of the devices. For example, processing resources of the client computer 102a and processing resources of the server computer 104a can be considered during negotiation. In some implementations, the negotiation is based at least in part on a degree to which each code block uses processing resources of one or more of the devices. For example, a particular code block may use a particular amount of processing power or memory. Prior to or during execution, for example, a computer executing the code block may determine that the code block requires more processing power or memory than is available on the executing computer or that the available processing resources are sufficiently limited that local execution will take longer than transmitting to another computer for execution and receiving the results back after such remote execution. In the present example, the computer negotiates that another computer handle or take over execution of the code block. In some implementations, the negotiation or assignment of code block execution is based at least in part on data defining execution constraints or characteristics of the code block. For example, the code block can be decorated with metadata describing preferred characteristics of one or more computers capable of executing the code block, the runtime, and memory, storage, and security characteristics.

In some implementations, based on the negotiations, one or more computers can assign at runtime of the software application which computer device is to execute each of the plurality of code blocks. For example, the client computer 102a can evaluate its own processing resources in comparison to the execution constraints or characteristics of a particular code block. If the client computer 102a determines that it has sufficient processing resources to execute the code block, for example, the client computer 102a may elect to execute the code block. If the client computer 102a determines that it does not have sufficient processing resources to execute the code block (or that another device could more efficiently handle the execution), for example, the client computer 102a can request that the server computer 104a execute the code block. As another example, if the client computer 102a determines that it does not completely satisfy the execution constraints or characteristics of the code block, but that its connection to the server computer 104a is inadequate, the client 102a may elect to execute the code block.

In some cases, the client computer 102a is in communication with multiple client computers 102 and multiple server computers 104. Using a negotiation protocol, for example, the client computer 102a can make a general request to the computers 102, 104 for execution of a particular code block. For example, the client computer 102a can determine that it has insufficient resources for executing the code block. In the present example, the client computer 102a can broadcast a request that an unspecified computer handle execution of the code block, and can indicate the execution constraints or characteristics of the code block. In some implementations, the request is made directly by the client computer 102a. In other implementations, the request is made through a mediating computer (e.g., the server computer 104a), which maintains information associated with the processing resources and characteristics of multiple computers. Using control messages, for example, the client computer 102a and/or the mediating computer can identify one or more computer devices that are capable of handling execution of the code block, and can hand off execution of the code block to the handling computer.

At 510, each of the plurality of code blocks are executed on the dynamically assigned devices. For example, code blocks assigned to the client computer 102a are executed by the computer 102a, and code blocks assigned to the server computer 104a are executed by the computer 104a. In some implementations, one or more code blocks can be reassigned during execution. For example, the client computer 102a can determine that it is inefficiently executing a particular code block. In the present example, the client computer 102a may determine that the code block would be more effectively executed by the server computer 104a, considering the characteristics of the computer 104a, and considering data transfer rates over the network 110. Thus, the client computer 102a may request that the server computer 104a handle execution of the code block.

At 512, data is communicated between assigned devices. In some implementations, the data communicated between the devices may be identified based on an index identifying boundaries between the code blocks and identifying variables (or other execution context data) operated on by each code block. For example, the client computer 102a may complete execution of a particular code block, and may determine that a subsequent code block is to be executed by the server computer 104a. Referring to the index 122, for example, the client computer 102a can identify variables needed by the server computer 104a for execution of the subsequent code block. At 514, variable values are shared between the devices. In the present example, the client computer 102a can determine the values of variables needed by the server computer 104a for execution of its assigned code block, and can provide the values to the computer 104a. In some implementations, a shared data area may be maintained (e.g., on one or more of the storage devices 112, 114) for providing variable values. For example, the shared data area can facilitate performing operations on the same or related values by multiple computer devices 102, 104 in parallel. In some implementations, dedicated runtime environments and/or devices may be configured for parallel data processing. For example, client computer 102a can identify one or more code blocks requiring data processing, and can request that multiple devices process those blocks concurrently.

A series of example negotiations for execution of code blocks between a client (e.g., the client computer 102a) and a server (e.g., the server computer 104a) is set forth below. At runtime, for example, the client can negotiate with the server regarding which blocks are to run on the client, and which blocks are to run on the server. The negotiation can be based on factors such as relative capabilities of the client and the server, execution constraints of the code blocks, and user preferences.

Considering the following code segment:
private function computeHash(input:String):String
{
  var res:Array=new Array( );
  for (var i:int=0; i<10000; i++)
  {
  res[i]=scrambleBits(input);
  }
}

This segment may be partitioned by a compiler into two code blocks such as:
Block 1:
private function computeHash(input:String):String
{
   var res:Array=new Array( );
   var i:int=0;
   for (; i<10; i++)
   {
   res[i]=scrambleBits(input);
   }
}
Block 2:
for (; i<10000; i++)
{
   res[i]=scrambleBits(input);
}

In the present example, Block 1 requires an input value; Block 2 requires values for the variables i, input, and res. Block 2 can return a modified array. If Block 1 executes on the client until the value for i equals 10, a runtime environment operating on the client may determine by that point that the operation could be more effectively performed using more processing capabilities than are available to the client. For example, the client can monitor its CPU usage, track execution time, or use some other such technique to make the determination. Upon making the determination, for example, the client can negotiate with the server and can request that the server begin executing Block 2 for values of i from 10 to 10,000. The client can pass the variable values and an identifier for Block 2 to the server, for example. The server can begin execution of Block 2, for example, and upon completion, can return the modified array to the client.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus, the method comprising:
   storing a plurality of code blocks of a software application on each of a plurality of devices, the software application adapted to perform a particular set of functions;
   assigning, by operation of data processing apparatus, at runtime of the software application which of the plurality of devices is to execute which of the plurality of code blocks, including:
      determining a set of capabilities necessary for execution of each of the plurality of code blocks;
      determining a set of capabilities of each of the plurality of devices;
      comparing the set of capabilities necessary for each code block to the set of capabilities of each of the plurality of devices;
      assigning at runtime which of the plurality of devices is to execute which of the plurality of code blocks based on the result of the comparison;
   executing the plurality of code blocks on the assigned devices; and
   communicating data between the assigned devices to facilitate executing different code blocks of the plurality of code blocks on different devices of the plurality of devices.

2. The method of claim 1 wherein assigning which of the plurality of devices is to execute which code block is based on data defining at least one of execution constraints or characteristics of the code block.

3. The method of claim 1 wherein the data communicated between the assigned devices is identified based on an index defining boundaries between the code blocks and identifying variables operated on by each code block.

4. The method of claim 1 further comprising determining that a network connection is available for a device that initiates execution of the software application prior to determining which of the plurality of devices is assigned to execute which of the plurality of code blocks.

5. The method of claim 1 further comprising dynamically determining which device is assigned to execute which code block based on at least one of available processing resources for one or more of the plurality of devices or a demand each code block places on processing resources of one or more of the plurality of devices.

6. The method of claim 1 further comprising executing code blocks on at least two of the plurality of devices and sharing variable values between the at least two devices.

7. A non-transitory computer storage medium encoded with a computer program, the program comprising instructions that when executed by data processing apparatus cause the data processing apparatus to perform operations comprising:
   receiving software code including a plurality of code blocks;
   analyzing the software code to identify boundaries between the code blocks;

generating an index of the boundaries between the code blocks; and storing the index for use in identifying portions of the software code to be executed on different computer devices during a subsequent execution of the software code.

8. The computer storage medium of claim 7, wherein the instructions further cause the data processing apparatus to perform operations comprising:

identifying execution contexts for each code block; and storing, in the index, data relating to the execution contexts for each code block.

9. The computer storage medium of claim 8 wherein the execution contexts include at least one of input data, variables, or state data.

10. The computer storage medium of claim 7, wherein the boundaries between the code blocks are defined by different logical operations performed by the code blocks on each side of each boundary.

11. The computer storage medium of claim 7, wherein the boundaries between the code blocks are defined by operations on different input values on each side of each boundary.

12. The computer storage medium of claim 7, wherein the boundaries between the code blocks are defined according to code blocks capable of execution on different computing devices.

13. The computer storage medium of claim 7, wherein analyzing the software code is performed by a compiler.

14. The computer storage medium of claim 7 wherein the software code is adapted for execution in a client-server environment.

15. The computer storage medium of claim 7 wherein the software code includes instructions to execute one or more specific code blocks on one of a particular device or particular type of device.

16. The computer storage medium of claim 7 wherein at least one of the code blocks or the index includes metadata defining execution constraints.

17. A system comprising:

a plurality of computers;

a network adapted to facilitate communications between the plurality of computers; and a plurality of storage devices, with each storage device associated with a corresponding computer, wherein each storage device stores:

first instructions operable, when executed by the corresponding computer, to perform a predefined set of operations; and wherein at least one of the storage devices stores:

an index defining boundaries between code blocks of the first instructions; and second instructions operable, when executed by the corresponding computer, to determine which of the plurality of computers should execute particular code blocks of the first instructions, wherein determining which of the plurality of computers should execute particular code blocks includes negotiating between the plurality of devices to determine which of the plurality of devices is to execute which of the plurality of code blocks.

18. The system of claim 17 wherein at least one of the storage devices stores third instructions operable, when executed by the corresponding computer, to request directions from another of the computers regarding whether to transfer data to another of the plurality of computers for execution of one or more code blocks of the first instructions.

19. The system of claim 17 wherein the plurality of computers includes a client device and a server.

20. The system of claim 17 wherein the plurality of computers includes a plurality of peer computing devices.

21. The system of claim 17 wherein at least one of the storage devices includes data defining an execution context for one or more of the code blocks of the first instructions.

22. The method of claim 1, wherein assigning at runtime which of the plurality of devices is to execute which of the plurality of code blocks includes negotiating between the plurality of devices to determine which of the plurality of devices is to execute which of the plurality of code blocks.

23. The method of claim 1, where the capabilities necessary for execution of each of the code blocks and the capabilities of each of the plurality of devices are selected from the group consisting of: available memory, available processors, current processor usage, available storage, available network capacity, and available security measures.

* * * * *